Patented Nov. 19, 1940

2,221,796

UNITED STATES PATENT OFFICE 2,221,796

PREPARATION OF SODIUM THIOCARBONATE

Sheldon B. Heath and Wallis R. Bennett, Midland, Mich., assignors to The Dow Chemical Company, Midland, Mich., a corporation of Michigan No Drawing. Application March 4, 1939, Serial No. 259,794

8 Claims. (Cl. 23—50)

This invention is concerned with an improved method for the preparation of sodium thiocarbonate and a product thereby obtained.

Sodium thiocarbonate is a yellow, crystalline compound soluble in cold water and decomposed by hot water. This compound is commonly prepared by reacting carbon bisulphide with sodium sulphide hydrate to obtain a crude product which has been found useful as a weed killer. A potential use of the compound as a component of insecticidal and antiseptic compositions and as a laboratory reagent requires that the compound be employed in water solution. Aqueous compositions heretofore available have contained as an impurity sodium sulphide in amount equal to from 10 to 30 per cent by weight of dissolved sodium thiocarbonate and since sodium sulphide is an active tanning agent and otherwise objectionable, it is desirable that some means be developed to provide sodium thiocarbonate solutions substantially free of sodium sulphide contamination.

Among the objects of this invention are (1) to provide a commercially feasible method whereby solutions of sodium thiocarbonate may be prepared which are substantially free of sodium sulphide contamination, and (2) to provide a method for the preparation of sodium thiocarbonate from carbon bisulphide and sodium sulphide hydrate wherein the sodium sulphide hydrate is substantially completely reacted with the carbon bisulphide so that the involved procedure of separation of sodium thiocarbonate from residual sodium sulphide is obviated.

According to the invention, concentrated aqueous solutions of sodium thiocarbonate are prepared containing less than 1 per cent by weight of sodium sulphide on the basis of the dissolved sodium thiocarbonate. This is accomplished by partially reacting sodium sulphide hydrate with a molecular excess of carbon bisulphide in the presence of water, thereafter adjusting the pH of the reaction mixture to 8.0 or higher and continuing the reaction to completion. The excess carbon bisulphide is thereafter separated and the product filtered to remove traces of insoluble heavy metal compounds. The desired sodium thiocarbonate solution so obtained is substantially free of sulphides.

The reaction is carried out at any suitable temperature below the refluxing temperature of the mixture at the pressure employed as, for example, from 20° to 45° C. Temperatures of from 25° to 40° C. are, however, generally employed, and 35° C. is the preferred reaction temperature when operating at atmospheric pressure. Where the reaction is carried out under superatmospheric pressure, somewhat higher temperatures may be employed, if desired.

A molecular excess of carbon bisulphide with respect to sodium sulphide hydrate is required in the reaction mixture. The amount of water employed is not critical but influences the rate at which the sodium sulphide hydrate is added to the reaction mixture. The minimum water required in the reaction zone varies with the amount of sodium sulphide hydrate present and the degree of hydration of the sodium sulphide, and is that amount which will not be completely used up in the formation of higher and solid sodium sulphide hydrates. While sodium hydroxide, and preferably an aqueous solution thereof, is generally used in correcting the pH of the reaction mixture following the preliminary reaction between the sodium sulphide hydrate and carbon bisulphide, other water-soluble alkaline materials may be employed, such as sodium carbonate. Such materials, however, do not always react with the sodium acid sulphide present in the reaction mixture and may be carried through into the final product as impurities. The optimum pH to which the mixture is adjusted prior to completion of the reaction depends upon the amount of water employed and on the concentration of the crude sodium thiocarbonate in the reaction mixture. Where it is desired to obtain as a final product a concentrated solution having a specific gravity of 1.50 or higher at 25°/4° C. and a pH range of 9.0 to 9.6, as determined by a glass electrode, the pH of the partially reacted mixture is adjusted to at least 8.0. The pH may be adjusted to higher values when more dilute solutions are involved. Any suitable equipment not attacked by the reaction mixture may be employed, such as glass-line, iron, or nickel stills, and the like.

In carrying out the invention, all of the sodium sulphide hydrate may be added to the carbon bisulphide and a suitable amount of water, the mixture partially reacted, the pH adjustment made, and the reaction completed, the mixture being thereafter treated in known manner to remove excess carbon bisulphide and water-insoluble metal salts. In actual practice, however, it is generally preferred to employ a reduced amount of water in mixture with the carbon bisulphide and to add the sodium sulphide hydrate portionwise to this mixture in such manner and amount that each portion of sodium sulphide hydrate, although it may be initially insoluble in the water present, is reacted with or dispersed in the reaction mixture before additional amounts thereof are added. After all of the sodium sulphide hydrate has been added and at least partially reacted with the carbon bisulphide, the sodium hydroxide or other suitable alkali is added in amount sufficient to neutralize any sodium acid sulphide in the mixture and to impart to the mixture a pH not lower than 8.0. The reaction is thereafter continued to completion, as determined by analysis of aliquot portions of the mixture, and the excess and unreacted carbon bisulphide separated as by layering off or by evaporation. The resulting product consists essentially in a water solution of sodium thiocarbonate which is filtered, if desired, to remove small amounts of impurities such as insoluble iron salts and the like.

The following example sets forth one embodiment of our invention, but is not to be construed as limiting the same:

A mixture of 600 grams of carbon bisulphide, 300 grams of distilled water, and 234 grams of a commercial sodium sulphide hydrate flake containing 10 per cent by weight sodium bisulphide and 50 per cent sodium sulphide in the form of mixed hydrates, were mixed together and agitated in a glass-lined reactor equipped with a reflux condenser at a temperature just below the reflux temperature of the mixture. As soon as the sodium sulphide hydrate was dispersed, an additional 233 grams thereof was added with mixing and the reaction continued until this also passed into the solution. Another 233 gram portion of sodium sulphide hydrate was then added and the mixture agitated at a temperature below the reflux temperature and in the neighborhood of 35°-40° C. until no solid sodium sulphide hydrate flake remained in suspension. 125 grams of 50 per cent by weight aqueous sodium hydroxide was then poured slowly into the reaction mixture, this amount being sufficient to neutralize the sodium bisulphide present and to adjust the pH of the mixture to approximately 8.05, as determined with a glass electrode. Agitation at 35° C. was thereafter continued for 24 hours, at the end of which time the excess carbon bisulphide present in the reaction mixture was layered off and the aqueous solution filtered through asbestos. The resultant solution had a pH of above 9.0, a specific gravity of 1.495 at 20° C., and contained 55.85 per cent by weight of sodium thiocarbonate, 0.08 per cent of sodium sulphide, 1.45 per cent of sodium carbonate, 0.68 per cent of sodium thiosulphate, 0.29 per cent of sodium chloride, and 41.65 per cent of water. This solution did not burn or flash at temperatures below its boiling point of 120° C.

By varying the proportions of reactants or water shown in the foregoing example and/or modifying the reaction conditions with respect to temperature, time and pH within the limits indicated, aqueous solutions of sodium thiocarbonate may be obtained of varying percentage composition. In operating according to the invention, however, such solutions contain less than 1 per cent by weight of sodium sulphide or other water-soluble sulphides on the basis of sodium thiocarbonate produced.

Other modes of applying the principle of our invention may be employed instead of those explained, change being made as regards the steps or products herein disclosed, provided the step or steps or the products recited in the following claims be thereby carried out or obtained.

We therefore particularly point out and distinctly claim as our invention:

1. A method for the preparation of sodium thiocarbonate which comprises the steps of partially reacting sodium sulphide hydrate with a molecular excess of carbon bisulphide in the presence of water, thereafter adding alkali in sufficient amount to adjust the pH of the reaction mixture to above 8.0, and continuing the reaction to completion.

2. In the preparation of sodium thiocarbonate from sodium sulphide hydrate and a molecular excess of carbon bisulphide in the presence of water, the steps which consist of adjusting the pH of a partially reacted mixture of the above materials to above 8.0 with alkali, and thereafter completing the reaction by warming to a temperature not in excess of the reflux temperature of the mixture at the pressure employed.

3. A method for the preparation of concentrated and substantially sodium sulphide-free sodium thiocarbonate solutions from sodium sulphide hydrate, a molecular excess of carbon bisulphide, and water in amount sufficient to dissolve all the sodium sulphide hydrate employed, comprising the steps of adding the sodium sulphide hydrate portion-wise to a mixture of the carbon bisulphide and water at a temperature not in excess of the reflux temperature of the reaction mixture at the pressure employed, correcting the pH of the partially reacted mixture to about 8.0 with alkali, warming the mixture to the reaction temperature for an additional period sufficient to complete the reaction, and separating the excess carbon bisulphide.

4. A method for the preparation of sodium thiocarbonate which comprises the steps of partially reacting sodium sulphide hydrate with a molecular excess of carbon bisulphide in the presence of water, thereafter adding sodium hydroxide to the mixture in such amount as to provide a pH of above 8.0 therein, and continuing the reaction to completion.

5. In the preparation of sodium thiocarbonate from sodium sulphide hydrate and a molecular excess of carbon bisulphide in the presence of water, the steps which consist of adding to a partially reacted mixture of the above materials sufficient sodium hydroxide to adust the pH thereof to above 8.0, and thereafter completing the reaction by warming to a temperature not in excess of the reflux temperature of the mixture at the pressure employed.

6. A method for the preparation of substantially sodium sulphide-free sodium thiocarbonate comprising the steps of mixing sodium sulphide hydrate with a molecular excess of carbon bisulphide in the presence of water at a temperature not in excess of the reflux temperature of the mixture at the pressure employed, adding sodium hydroxide to the reacted mixture in amount sufficient to neutralize sodium acid sulphide present therein and to impart a pH of above 8.0 thereto, and continuing the reaction to completion.

7. A method for the preparation of concentrated and substantially sodium sulphide-free sodium thiocarbonate solutions from sodium sulphide hydrate, a molecular excess of carbon bisulphide, and water in amount insufficient to dissolve all of the sodium sulphide hydrate employed, comprising the steps of adding the sodium sulphide hydrate portion-wise to a mixture of the carbon bisulphide and water at a temperature not in excess of the reflux temperature of the reaction mixture at the pressure employed, adjusting the pH of the partially reacted mixture to above 8.0 with aqueous sodium hydroxide, warming the mixture to the reaction temperature for an additional period sufficient to complete the reaction, and separating the excess carbon bisulphide.

8. An aqueous solution of sodium thiocarbonate comprising water-soluble sulphides in amount not in excess of 1 per cent by weight of dissolved sodium thiocarbonate as prepared by the method of claim 1.

SHELDON B. HEATH.
WALLIS R. BENNETT.